3,377,172
QUICK FREEZING OF RASPBERRIES

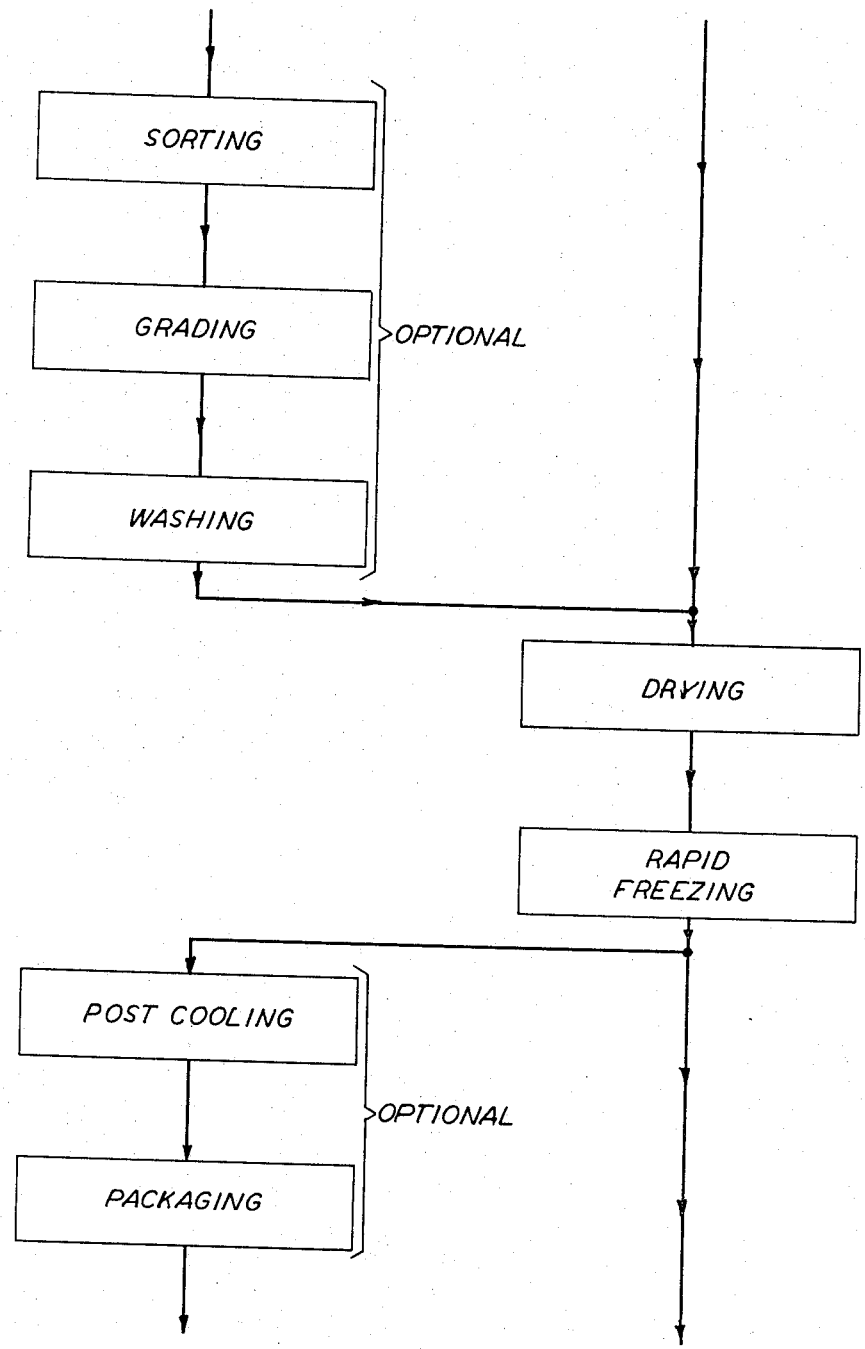

Ernest Joseph Benson, Madison, Wis., David G. Dykstra, Portland, Oreg., and Robert C. Webster, Madison, Wis., assignors to Air Reduction Company, Incorporated, New York, N.Y., a corporation of New York
Filed July 10, 1964, Ser. No. 381,824
14 Claims. (Cl. 99—193)

ABSTRACT OF THE DISCLOSURE

The invention relates to a process for freezing aggregate type fruit in which the fruit to be frozen is initially washed to remove dirt, etc., and then dried to a point at which substantially all of the moisture in the fruit which is external of the cells of the fruit is evaporated. The fruit is then frozen by contact with a cryogenic media.

---

This invention pertains to the preservation of a particular type of fruit. More particularly, this invention pertains to the preservation of aggregate type fruit, for example, raspberries, in such a manner that the aggregate type fruit is both pleasing to the eye and delectable to the taste of the consumer.

The appeal of the aggregate type fruit, of which the red or black raspberry, the boysenberry, and the blackberry, are examples, is undeniable. The aggregate type fruit is that type of fruit which is composed on its surface of numerous cells connected together by hair-like fibers. Increasingly, such type fruit is finding its place on the dinner table in the form of an appetizer, an additive to the main course, or as a dessert. Unfortunately, bush ripened aggregate type fruit is highly susceptible to damage from bruising or spoilage. Therefore, it is difficult to supply bush ripened aggregate type fruit, such as raspberries, in a fresh form to the consumer, taking into account the handling required. As a consequence, it has been found necessary to pick the fruit before it is ripe, that is, in an immature condition. However, the difficulty with picking the aggregate type fruit before it is ripe is that the time available for handling is not greatly extended; and, perhaps more importantly the taste of the fruit suffers from being separated from the bush too early in its life.

Accordingly, it has been the practice of many food suppliers to can the aggregate type fruit, often in a thick heavy syrup. This suffers from at least three major disadvantages. First, many consumers want the fruit fresh, for their table, as a topping to cereal, for example, and therefore are not attracted by the canned product. Second, the canned fruit assumes a different texture and appearance upon canning, not as attractive to the consumer. And third, the consumer is limited to the tastes of the canned fruit provided by the producer in comparison to the fresh flavor of newly picked product. Therefore, it would seem desirable to freeze berry units in order to provide freshly picked fruit to the consumer in a manner most attractive to him.

The "blast tunnel" method of freezing has become common in freezing food produce. According to this method, the produce generally is frozen by subjecting it to a sub-freezing gaseous blast in a "tunnel," either a moving or still cold environment, for a sufficient period of time to freeze the produce solidly throughout. This conventionally requires freezing times up to several hours. The produce is generally subjected to either manual handling or handling on conveyors, for example, during the lengthy period for freezing, and this handling leads to breakage. The raspberry is particularly subject to breakage, because of its delicate construction. Furthermore, while this "blast tunnel" freezing is often referred to as "quick freezing," there is substantial cell destruction as a result of crystal growth during this type of freezing process. Ice crystal growth occurs in the cells of the fruit during the extended period of time for freezing. The crystal growth results in a destruction of the delicate construction and taste of the fruit, since when the fruit thaws it tends to lose its firmness and to "slump" (lose its shape) as a result of the crystal growth and subsequent cell fracture. It is characteristic, for example, of raspberries frozen according to the "blast tunnel" technique to "slump" and lose a large percetnage of their natural juices (drip loss) upon thawing. In addition, raspberries frozen by the "blast tunnel" technique lose a certain percent of their weight by dehydration during freezing so that not only is the constitution of the berry altered, but the net weight of the frozen product is substantially less than the fresh fruit prior to freezing, which in some instances could represent a significant economic factor in the distribution of the product.

To prevent crystal growth during the freezing of food, it has been proposed that produce be frozen rapidly as a result of rapid heat exchange with a cryogenic media, that is, a liquid and/or gas of a temperature below −100° F. The rapid freezing, usually a matter at most of minutes, does not allow time enough for damaging crystal growth. Direct immersion of the product in liquid nitrogen is often the method employed for heat transfer in food freezing. However, although it has been known that a cryogenic media will rapidly freeze food produce in heat exchange relationship therewith, rapid freezing has never been completely successful with the aggregate type fruit. It has now been found by the inventors that the nature of the aggregate type fruit is the reason for the previous lack of success.

The great advantage resulting from rapid freezing as a result of heat exchange with a cryogenic media would be of significant value in the freezing of aggregate type fruit, if the reason for lack of previous success could be overcome. The underlying concept of rapid freezing as a result of heat exchange with a cryogenic media, such as immersion in liquid nitrogen, has been that the faster the freezing cycle, the lower the rate of crystal formation in the finished product. The marked decrease in crystal size eliminates the problem of cell fracture in the produce, resulting in virtual elimination of drip loss as a problem and improvement in texture and other qualities. Furthermore, rapid freezing techniques employing a cryogenic media require significantly less handling of the produce than the "blast tunnel" techniques, resulting in the reduction of loss of produce due to breakage from handling. This is extremely important in the case of the delicate raspberry, one example of an aggregate type fruit. Therefore, it is desirable to freeze mature aggregate type fruit, for example raspberries or blackberries, as a result of heat exchange with cryogenic fluid. However, as stated above, it has been found by the inventors that the nature of the aggregate type fruit results in unsuccessful rapid freezing when heretofore utilized methods of rapid freezing are employed.

As stated earlier, the aggregate type fruit is composed of numerous cells interconnected by hair-like fibers. In the course of rapid freezing, utilizing a cryogenic media, as by immersion in a cryogenic liquid, the cells of the aggregate type fruit have been found to separate. The inventors have discovered that this separating phenomenon, which results in the destruction of the whole fruit into individual cells or "droplets" is caused by the fact that the hair-like connecting fibers are wet. In the normal packing procedures the raspberry is washed after picking to remove field dirt, mold, insect fragments, and other deleterious substances. The unwashed fruit has much stronger strength or resistance to breakage, but the practice of freezing unwashed produce would not be consistent with good sanitary practices. The wetness of the hair-like fibers before the rapid freezing by heat exchange with a cryogenic media results in breakage during handling since the wet hair-like fibers do not effectively hold the cells together and results in shattering of the structure of the aggregate type fruit upon such rapid freezing. The shattering occurs upon rapid freezing, for example, immersion type freezing, because the hair-like fibers become brittle when frozen while wet and break easily, allowing the cell construction to fall apart. It has been found that the hair-like fibers of the aggregate type fruit must be dried before the fruit is subjected to the cryogenic media, for example, immersed, if the fruit is to be held together as a unit by the fiber connecting members during handling and rapid freezing.

It is therefore an object of this invention to provide an improved method of preserving the fresh bush-ripened characteristics of the mature aggregate type fruit.

It is further an object of this invention to provide an improved method of preserving the fresh bush-ripened characteristics of the mature raspberry.

Another object is to provide rapid freezing of aggregate type fruit, which when thawed, has substantially the characteristics of the fresh fruit before freezing.

Still another object of this invention is to provide a novel method of freezing raspberries that will enable the berries to be frozen quickly, to be preserved for long periods of time and to be transported over long distances with frequent handling, without adverse effect, whereupon, the fruit when thawed retains substantially all of the desirable characteristics of the bush-ripened, unfrozen, fresh raspberry.

These and other objects and advantages of the invention will be pointed out or will become apparent from the following description and accompanying drawing.

According to the present invention, aggregate type fruit, for example, the raspberry, that is fruit including cells interconnected by hair-like fiber connecting structure, are rapidly frozen as a result of heat exchange with a cryogenic freezing media, for example immersion or spraying with liquid nitrogen. The aggregate type fruit may be pre-cooled as a result of contact with a gas at cryogenic temperature, if desired. Each whole individual fruit unit is frozen in its whole individual condition. The novel process set forth in this specification incorporates a drying step prior to the rapid freezing to remove wetness from the hair-like fibers. When the hair-like fibers are dry, they hold the fruit together more effectively during movement and, when subjected to the cryogenic temperatures of the freezing media, they remain intact, thus holding together a whole frozen aggregate type of fruit unit.

The preferred process is diagrammatically illustrated in the accompanying drawing. A more detailed understanding of the novel method and product may be obtained from the following detailed description.

In the preferred practice of the present invention, the aggregate type fruit may first be sorted to select mature fruit in good condition. The fruit may next be graded for size. The two steps just mentioned, that is sorting and grading, do not form a part of the invention and may be omitted or included, as desired.

Following whatever sorting and grading that takes place, the fruit may be washed to remove dust and/or other impurities. Again, this step may be included or omitted, as found desirable or necessary to good packing practices.

It is common at this point in attempting to preserve product to flash-freeze (the rapid freezing previously discussed) each unit (a unit being an individual item of produce) by contact with a cryogenic media without drying the produce or any part thereof. As fully explained above, an unsatisfactory product in the case of aggregate type fruit results. Therefore, the next step in the preferred process, as diagrammatically illustrated, is the drying of the hair-like fibers of the aggregate fruit product. Such drying must be of sufficiency so as to remove water from the hair-like connecting fibers obtained, for example from the field, from the inherent nature of the fruit, or from a washing step. The drying may be effected by passing air or dry nitrogen effluent across the berries, or by some other method which allows for evaporation. The nitrogen effluent used for drying will also pre-cool the berries before their contact with the primary freezing media, but such pre-cooling will not cause the rapid freezing of the fruit effected by the contact of the liquid nitrogen, for example, as discussed below. The hair-like fibers will dry faster than the cells they interconnect, thus preventing the cells themselves from drying out, since the hair-like fibers are external of the cells and thus exposed to a much greater extent to the drying media than the interior of the cells. The hair-like fibers are dried to a point at which substantially all of the moisture about said fibers is evaporated, but said fibers are not subject to the drying media to a point at which, at most, more than 5 percent of the weight of the fruit is lost.

The next step in the preserving process is the rapid freezing of the aggregate type fruit with dry hair-like fibers as a result of heat exchange with a cryogenic media, such as liquid nitrogen. Other rapid (flash-freezing) techniques, such as spraying, may alternatively be used without departing from this invention. In the immersion freezing of raspberries with liquid nitrogen approximately 15 seconds is all that is necessary to freeze the berries thoroughly.

It is emphasized that drying of the hair-like fiber allows for handling of the aggregate type fruit prior to immersion without destruction of the fruit. Furthermore, flash-freezing of the dried hair-like fibers actually serves to strengthen or toughen the fibers against breakage during freezing when the frozen fruit is handled—thus maintaining the fruit in whole condition.

Following immersion freezing, the aggregate type fruit may be post-cooled, if desired, and packaged.

The advantages of the process described above are numerous. The inclusion of the drying step allows the whole fruit to be handled more easily and to be rapidly frozen by heat exchange with a cryogenic media without the freezing resulting in shattering of the whole fruit construction. Therefore, the producer may guide the fruit to the consumer in a whole or individually quick frozen form, not "mush," which is both pleasing to the consumer's eye and in taste, equivalent to the freshly picked fruit. Raspberries have been mentioned as an example of an aggregate type fruit. Although the invention is not limited to raspberries, they are in demand by the consumer, and thus the invention is particularly applicable to that particular aggregate type fruit. Raspberries can be preserved by the process set forth above so that the product, when thawed, closely resembles the fresh, bush-ripened fruit. Furthermore, the above described process allows the producer to quick freeze aggregate type fruit raspberries, in a cryogenic liquid, thus resulting in all the advantages of the flash freezing techniques, such as minimal ice crystal growth in the cells so that the cells are not destroyed and the fruit maintains its taste and fresh characteristics.

It is within the scope of this invention to substitute other techniques of rapid (flash) freezing using cryogenic media than those previously recited, including partially or fully freezing the fruit with vapors from a cryogenic liquid.

The invention is not limited to the processes or methods specifically disclosed hereabove; but rather, the invention may be employed in other ways without departing from the scope of this invention, limited solely by the following claims.

We claim:

1. In the process of freezing whole fruit units which include hair-like fibers interconnecting cells thereof, the steps of drying the hair-like fibers interconnecting cells of each fruit unit to a point at which substantially all of the moisture about said fibers is evaporated, and freezing the units by contact with a cryogenic media.

2. In the process as claimed in claim 1, the steps of sorting and grading the fruit units before drying and post-cooling and packaging the fruit units after freezing.

3. In the process as claimed in claim 1, the step of pre-cooling the fruit units with effluent at cryogenic temperature.

4. In the process as claimed in claim 1, the step of pre-cooling the fruit units with effluent at cryogenic temperature, said effluent performing the said drying step previously recited.

5. In the process as claimed in claim 4, the cryogenic media and effluent being nitrogen.

6. In the process as claimed in claim 1, the step of washing the whole fruit units in order to remove field dust and other impurities before drying.

7. In the process of freezing whole raspberries which include hair-like fibers interconnecting cells thereof, the steps of drying the hair-like fibers interconnecting cells of each raspberry to a point at which substantially all of the moisture about said fibers is evaporated, and freezing the raspberries by contact with a cryogenic media.

8. In the process as claimed in claim 7, the steps of sorting and grading the raspberries before drying and post-cooling and packaging the raspberries after freezing.

9. In the process as claimed in claim 7, the step of pre-cooling the raspberries with effluent at cryogenic temperature.

10. In the process as claimed in claim 7, the step of pre-cooling the raspberries with effluent at cryogenic temperature, said effluent performing the said drying step previously recited.

11. In the process as claimed in claim 10, the cryogenic media and effluent being nitrogen.

12. In the process as claimed in claim 7, the step of washing the whole raspberries in order to remove field dust and other impurities before drying.

13. In the process of freezing whole raspberries, which raspberries include hair-like fibers interconnecting cells thereof, the steps of washing the raspberries in order to remove field dust and other impurities, pre-cooling the raspberries with an effluent at cryogenic temperature, drying the said hair-like fibers interconnecting the cells of each raspberry to a point at which substantially all of the moisture about said fibers is evaporated, and freezing the units as a result of contact with a cryogenic media.

14. In a process as claimed in claim 13, the cryogenic media and effluent being nitrogen.

References Cited

UNITED STATES PATENTS

| 3,039,276 | 6/1962 | Morrison | 99—193 X |
| 3,250,630 | 5/1966 | Webster et al. | 99—193 |
| 3,294,553 | 12/1966 | Benson | 99—193 |
| 3,297,454 | 1/1967 | Webster et al. | 99—193 |

OTHER REFERENCES

Tressler et al., The Freezing Preservation of Foods, Avi Pub. Co., 1957, pp. 548–549.

A. LOUIS MONACELL, *Primary Examiner.*

M. VOET, *Assistant Examiner.*